United States Patent
Amari

(10) Patent No.: US 9,882,416 B2
(45) Date of Patent: Jan. 30, 2018

(54) POWER RECEIVING BODY AND VEHICLE EQUIPPED WITH POWER RECEIVING BODY

(71) Applicant: HONDA MOTOR CO., LTD., Tokyo (JP)

(72) Inventor: Yusaku Amari, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 152 days.

(21) Appl. No.: 15/050,660

(22) Filed: Feb. 23, 2016

(65) Prior Publication Data

US 2016/0248271 A1 Aug. 25, 2016

(30) Foreign Application Priority Data

Feb. 25, 2015 (JP) ................................ 2015-034973

(51) Int. Cl.
| | |
|---|---|
| H02J 7/00 | (2006.01) |
| H02J 7/02 | (2016.01) |
| B60L 11/18 | (2006.01) |
| H02J 50/12 | (2016.01) |
| H02J 50/70 | (2016.01) |
| H02J 50/90 | (2016.01) |

(52) U.S. Cl.
CPC ............ *H02J 7/025* (2013.01); *B60L 11/182* (2013.01); *B60L 11/1838* (2013.01); *H02J 50/12* (2016.02); *H02J 50/70* (2016.02); *H02J 50/90* (2016.02)

(58) Field of Classification Search
CPC ..................................................... H02J 7/025

USPC ........................................................ 320/108
See application file for complete search history.

(56) References Cited

U.S. PATENT DOCUMENTS

| | | | | |
|---|---|---|---|---|
| 5,654,621 | A | * | 8/1997 | Seelig .................... B60L 11/182 320/108 |
| 2010/0201315 | A1 | | 8/2010 | Oshimi et al. |
| 2013/0119929 | A1 | * | 5/2013 | Partovi .................... H02J 7/025 320/108 |
| 2014/0191568 | A1 | * | 7/2014 | Partovi .................... H02J 7/025 307/9.1 |
| 2015/0303701 | A1 | | 10/2015 | Terao |

FOREIGN PATENT DOCUMENTS

| | | |
|---|---|---|
| JP | 2009-89465 A | 4/2009 |
| JP | 2014-217093 A | 11/2014 |
| JP | 2015-008552 A | 1/2015 |
| WO | WO2013/175596 A1 | 11/2013 |

OTHER PUBLICATIONS

Office Action dated Dec. 6, 2016, issued in counterpart Japanese Patent Application No. 2015-034973, with Partial English translation. (5 pages).

\* cited by examiner

*Primary Examiner* — Suresh Memula
(74) *Attorney, Agent, or Firm* — Westerman, Hattori, Daniels & Adrian, LLP

(57) ABSTRACT

A power receiving body and a vehicle including the power receiving body are provided, in which an object detection range, which corresponds to a non-contact charging condition between a power supplying coil and a power receiving coil, is set, together with variably setting the object detection range corresponding to a leakage magnetic field area.

4 Claims, 13 Drawing Sheets

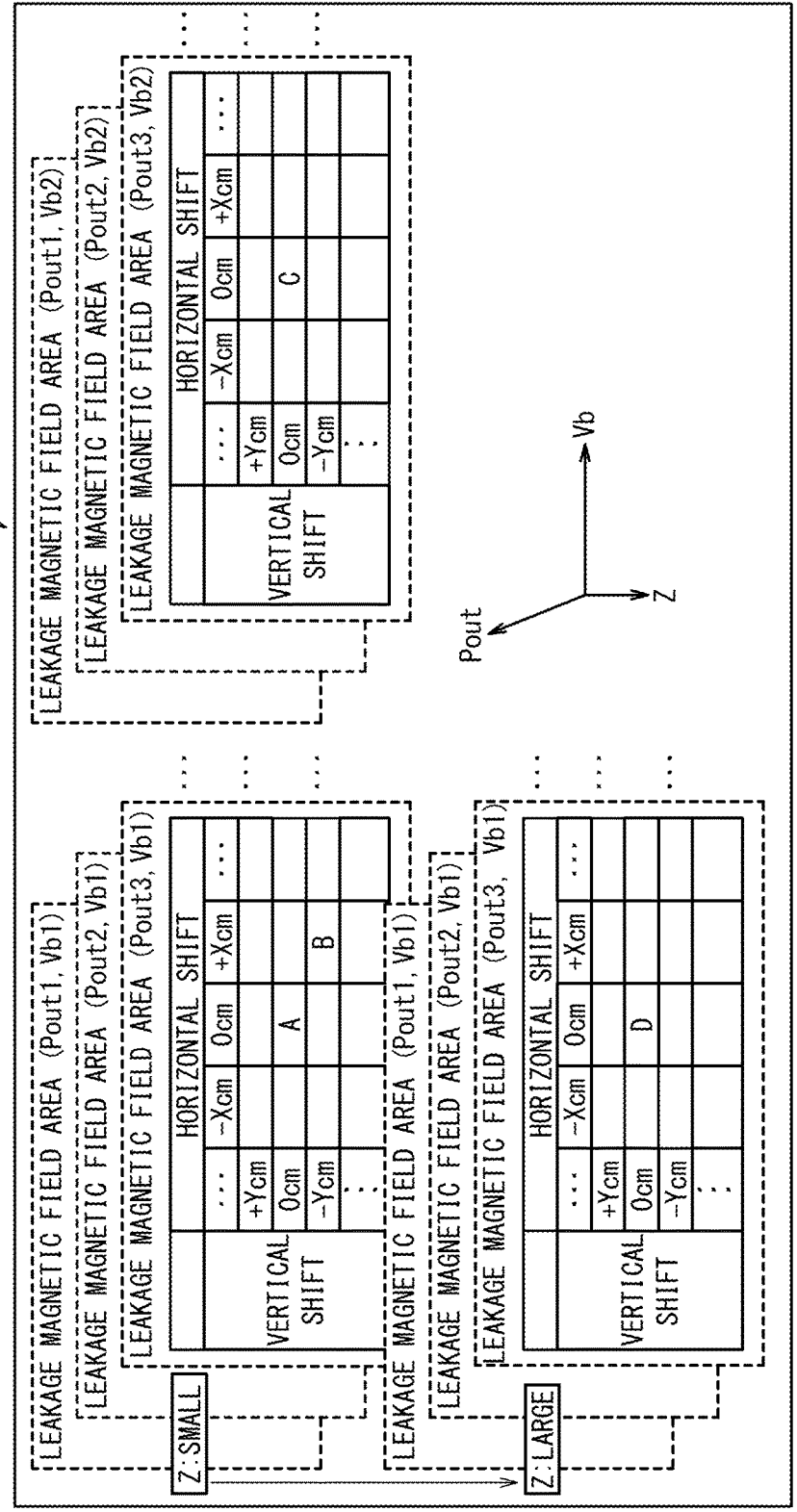

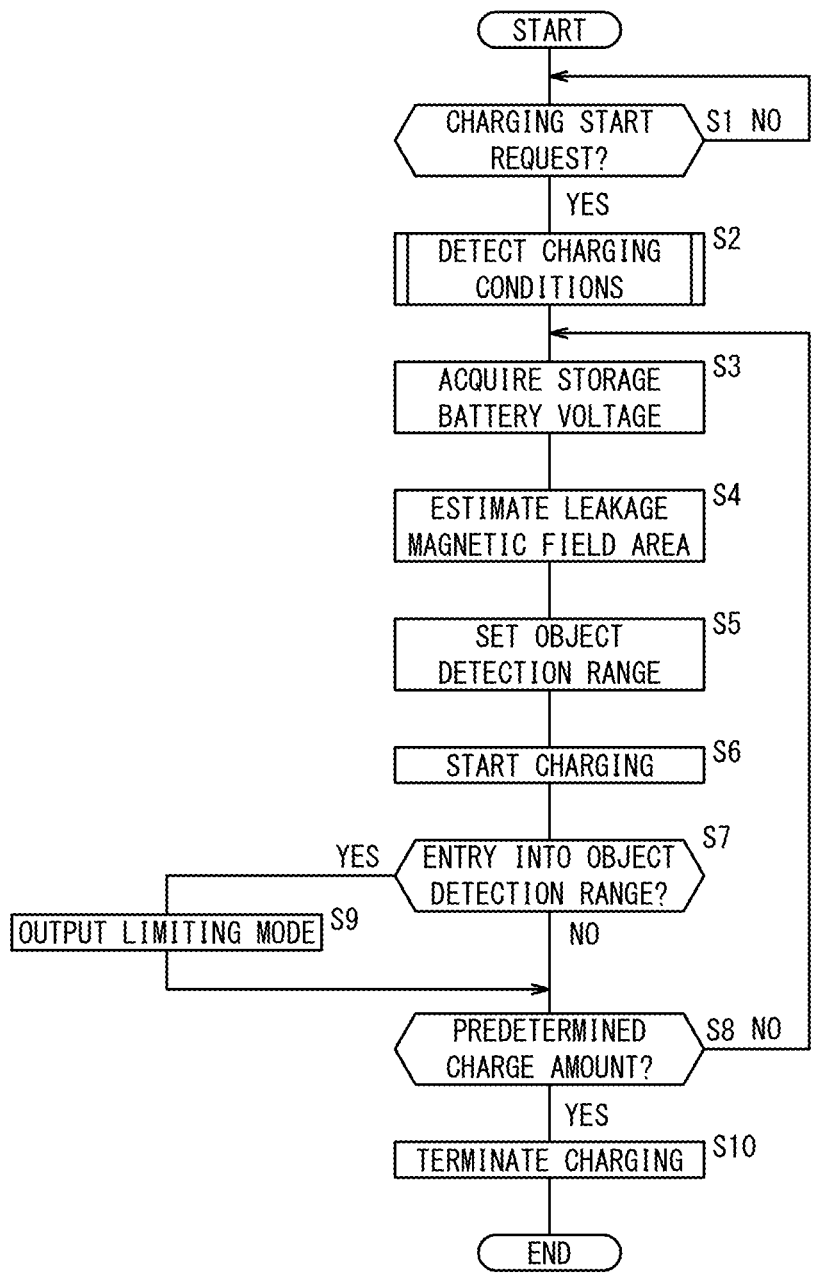

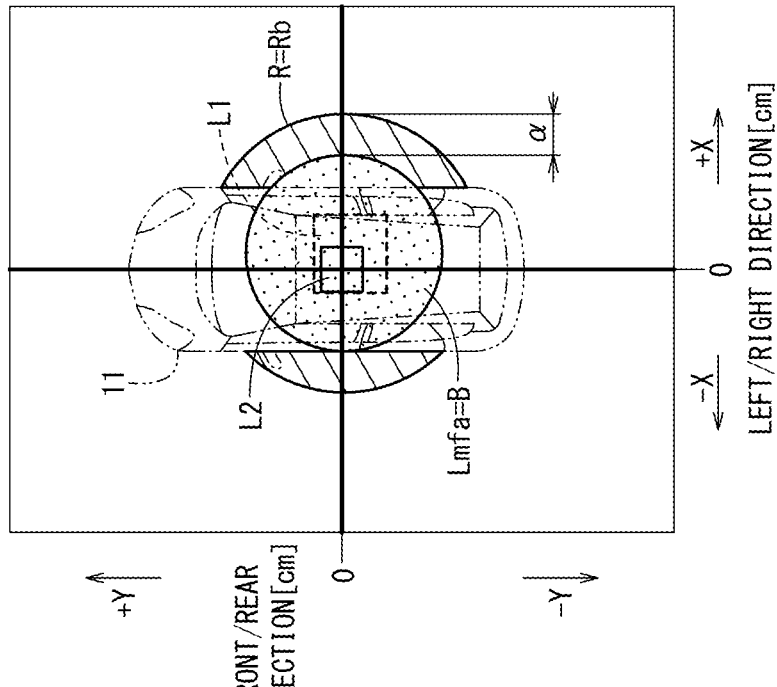
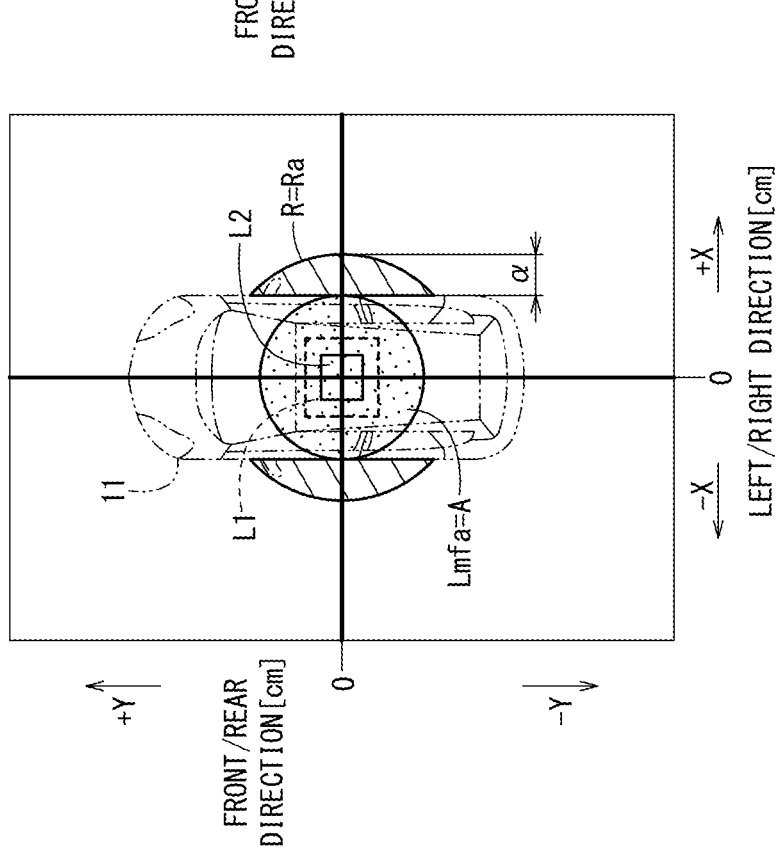

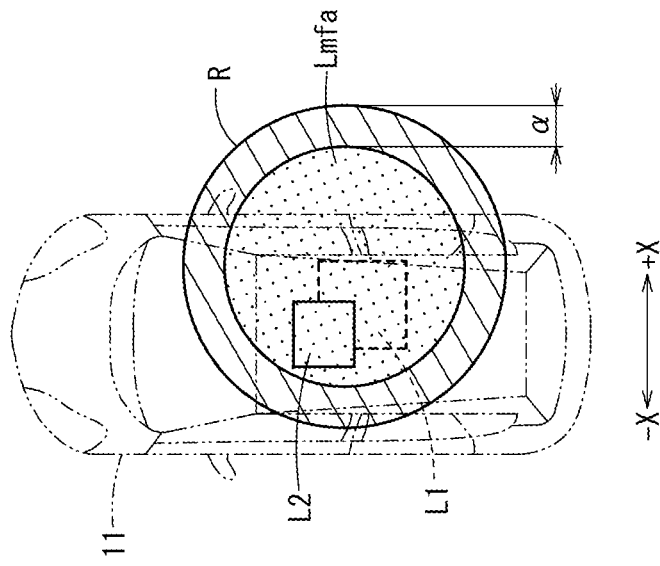
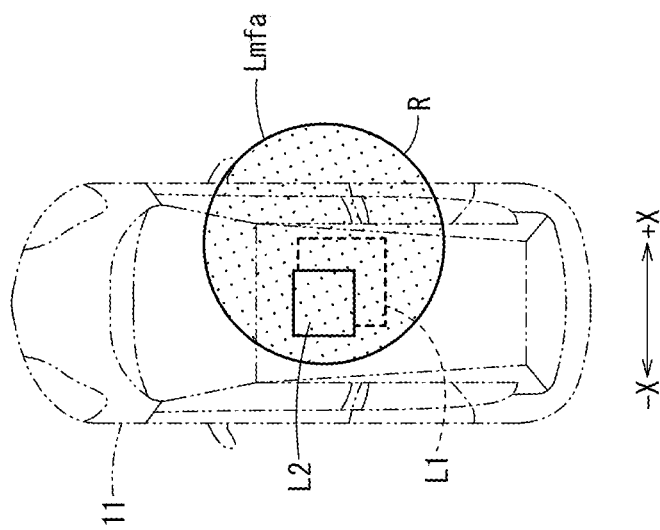

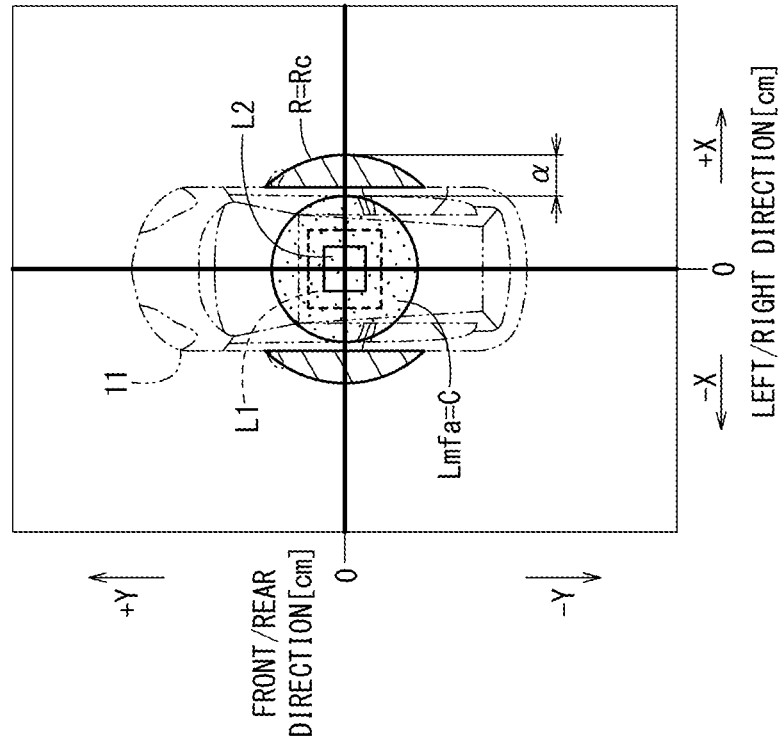
FIG. 9A VOLTAGE: LOW
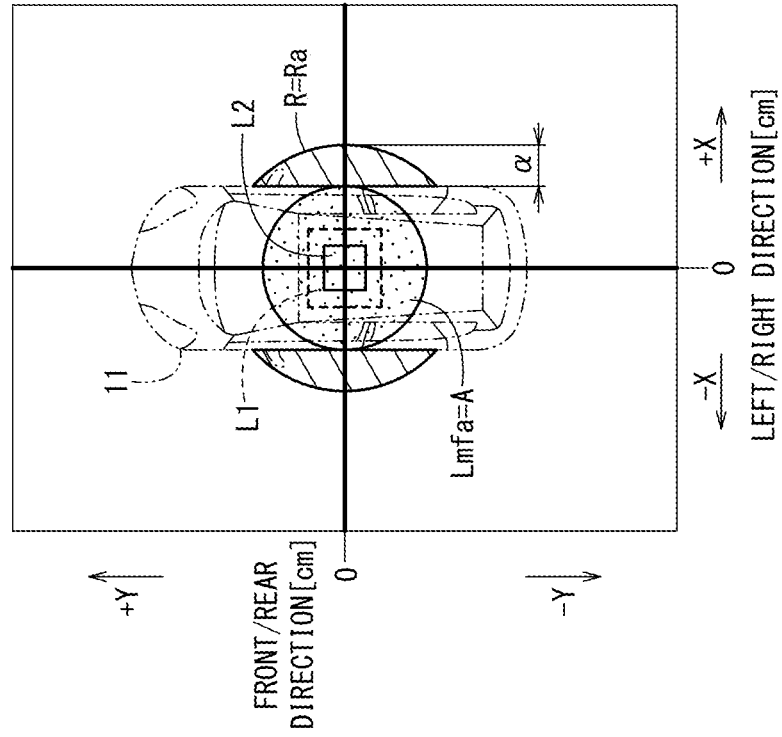
FIG. 9B VOLTAGE: HIGH

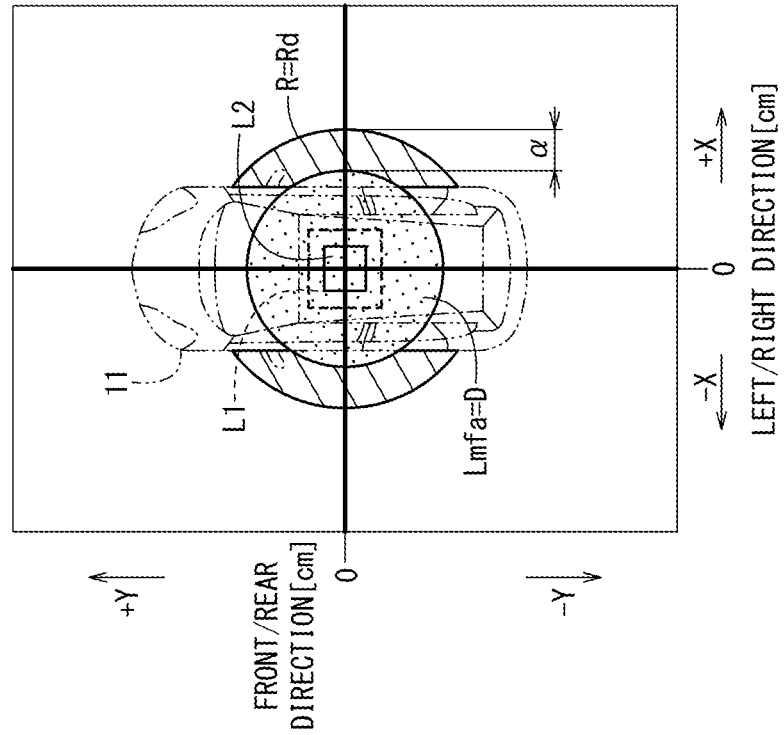
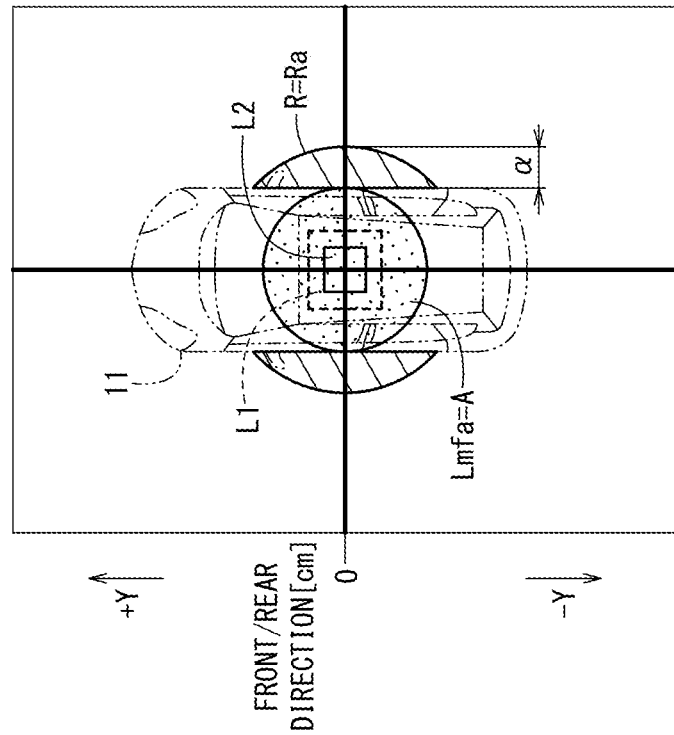

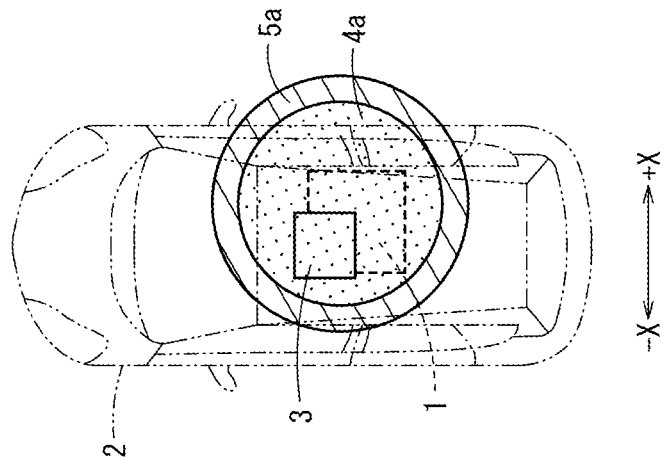
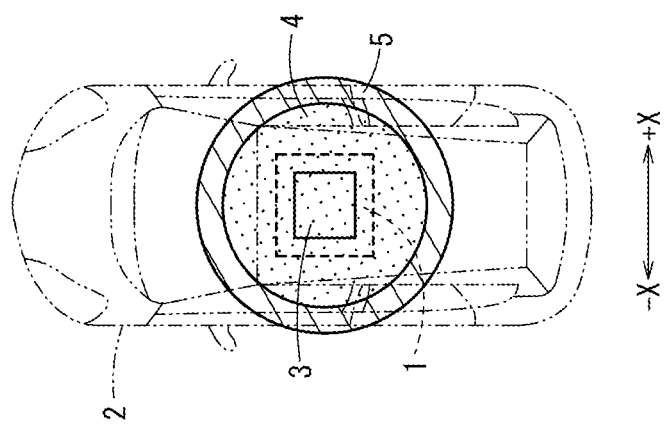

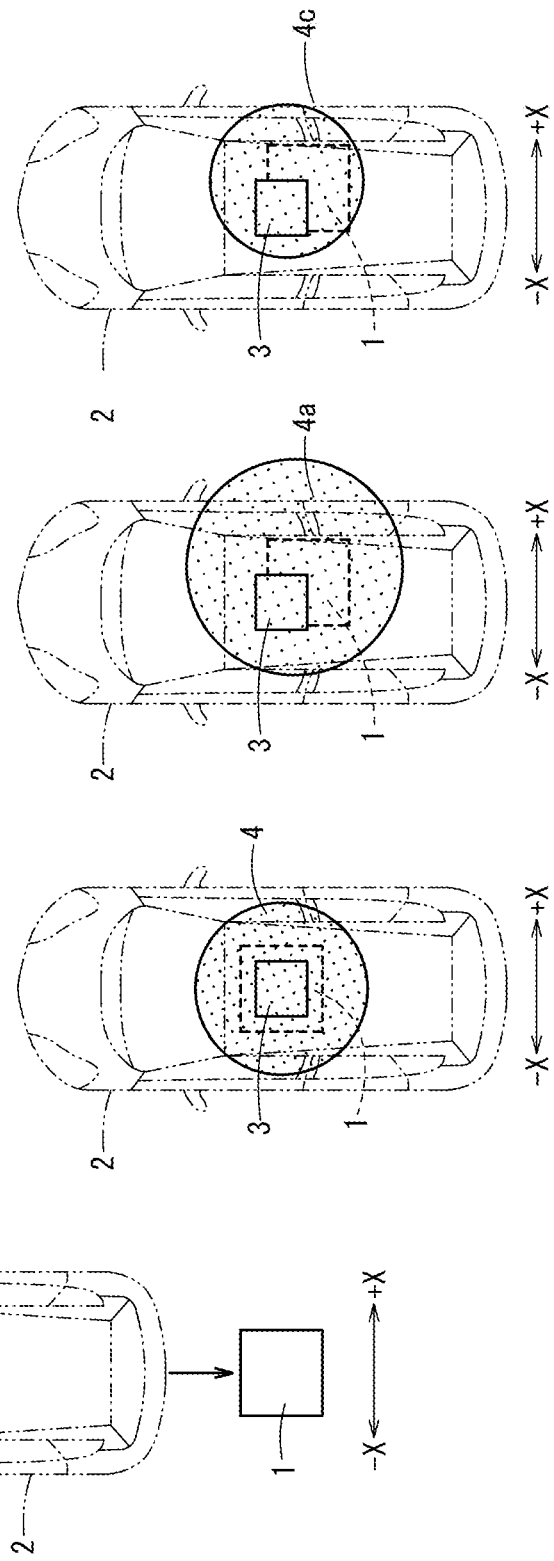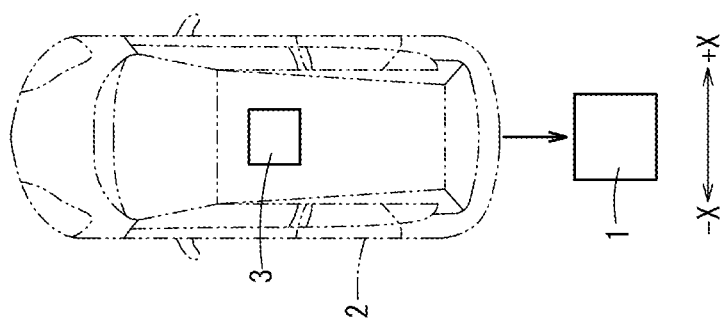

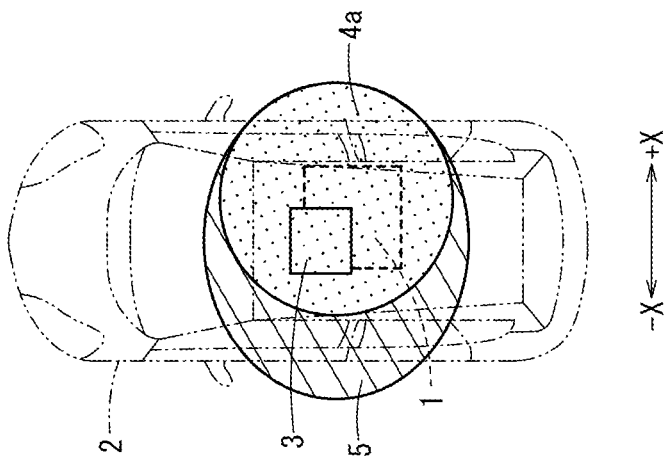
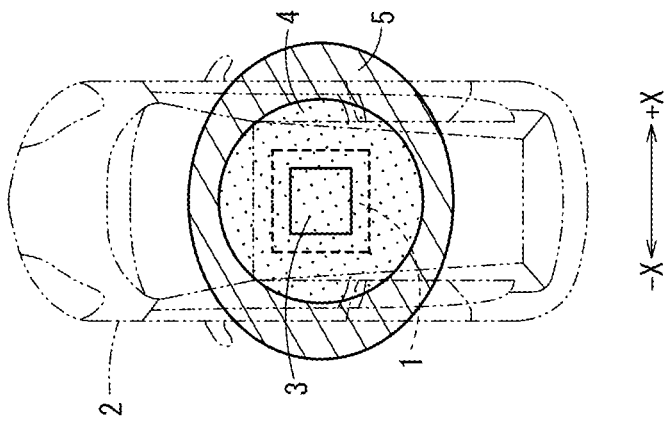

POWER RECEIVING BODY AND VEHICLE EQUIPPED WITH POWER RECEIVING BODY

CROSS-REFERENCE TO RELATED APPLICATION

This application is based upon and claims the benefit of priority from Japanese Patent Application No. 2015-034973 filed on Feb. 25, 2015, the contents of which are incorporated herein by reference.

BACKGROUND OF THE INVENTION

Field of the Invention

The present invention relates to a power receiving body, which includes a non-contact charging device that charges a storage battery by receiving power in a non-contact manner by a power receiving coil that receives power supplied from a power supplying coil, as well as to a vehicle comprising such a power receiving body.

Description of the Related Art

In Japanese Laid-Open Patent Publication No. 2009-089465 (hereinafter referred to as JP2009-089465A), a charging system is disclosed in which, when carrying out non-contact charging, a leakage magnetic flux is detected by a relative positional relationship between a power supplying coil and a power receiving coil (see paragraph [0123] of JP2009-089465A), and a user is notified (see paragraph [0131] of the same reference) through a positional shift display unit, so as to shift the position of an electronic device, for example, a cooking appliance to which a power receiving coil is fixed (see paragraph [0004] of the same reference), so that the leakage magnetic flux is increased. As a result, charging is carried out with respect to the electronic device at a position where power transmission efficiency is high (see paragraph [0125] of the same reference).

In this manner, during non-contact charging, it is known that a leakage magnetic flux is generated when the position is shifted between a power supplying unit equipped with a power supplying coil and a power receiving unit equipped with a power receiving coil, and the leakage magnetic flux increases as the amount of positional shifting becomes greater, and as the supplied power of the power supplying unit becomes greater.

SUMMARY OF THE INVENTION

In relation to the leakage magnetic flux and the like, in accordance with guidelines from the International Commission on Non-Ionizing Radiation Protection (ICNIRP), an electromagnetic field intensity is defined (leakage magnetic field intensity and leakage electric field intensity) which does not impart an influence on the human body.

Below, for facilitating understanding and to avoid complexity, although a leakage magnetic field intensity will be described by way of example, the present invention also is capable of being applied with respect to a leakage electric field intensity.

With this type of non-contact charging system, during non-contact charging, it is essential to suppress entry (invasion) of an object such as a human body into a leakage magnetic field area (leakage regulation value area) in which the magnetic field intensity from the power supplying coil has a predetermined value or more that imparts an influence on the human body.

Thus, for example, with a technique according to comparative example 1, as shown in FIG. 12A, it is considered that an electric vehicle 2 travels in reverse in the direction of the arrow, and non-contact charging is initiated by a power receiving coil 3, which is arranged substantially centrally on a lower side of the electric vehicle 2, being placed in facing relation with respect to a power supplying coil 1 provided on the road surface.

In this case, as shown in FIG. 12B, when there is no positional shifting and the rectangular surfaces of the power supplying coil 1 and the power receiving coil 3 coincide, a leakage magnetic field area 4 lies within the width of the vehicle, and no influence is received even if an object such as a human body or the like approaches near to the electric vehicle 2.

In contrast thereto, as shown in FIG. 12C, when the amount of positional shifting between the power supplying coil 1 and the power receiving coil 3 is large, a leakage magnetic field area 4a becomes larger than the leakage magnetic field area 4, and greatly exceeds the vehicle width.

In the case of such a large amount of positional shifting, as shown in FIG. 12D, it may be considered to narrow a leakage magnetic field area 4c so as to remain inside of the vehicle width by constricting (i.e., making smaller) the power supplied from the power supplying coil 1.

However, in the case that charging is continued in the condition shown in FIG. 12D, a problem occurs in that, due to the fact that the supplied power is small, the charging time until the storage battery (not shown) of the electric vehicle 2 is charged to a predetermined level becomes extended significantly.

In order to suppress an extension of the charging time, for example, as shown in FIGS. 13A and 13B, with a technique according to comparative example 2, it may be considered to provide on the electric vehicle 2 an object detecting sensor having an object detection range 5 of a fixed range around the power receiving coil 3.

In this case, as shown in FIG. 13B, it is necessary for the object detection range 5 to be set to a wide range into which objects do not enter into the leakage magnetic field area 4a when a time that the positional shift is large is assumed as a reference.

However, in the case that the object detection range 5 is set beforehand to a wide range, a problem occurs in that supply of power is terminated when an object is detected, even within an area in which the leakage magnetic field is low outside of the leakage magnetic field areas 4, 4a, or stated otherwise, within an area (hatched areas in FIGS. 13A and 13B) that does not correspond to the leakage magnetic field areas 4, 4a.

The present invention has been devised taking into consideration the aforementioned problems, and has the object of providing a power receiving body and a vehicle comprising the power receiving body, which is capable of reliably detecting objects within a leakage magnetic field area, suppressing detection of objects unnecessarily (excessively) within areas that do not correspond to the leakage magnetic field area, and of continuing the charging state insofar as possible, even in the case of relative shifting in position between the power supplying coil and the power receiving coil in relation to non-contact charging (non-contact transmission).

In contrast to comparative example 1 and comparative example 2, FIG. 11A is a schematic drawing in plan view for describing a relationship between the object detection range 5 and the leakage magnetic field area 4, for a case in which there is no positional shifting between the power supplying coil 1 and the power receiving coil 3, in an electric vehicle 2 as a power receiving body according to the present invention. In contrast to comparative example 1 and comparative example 2, FIG. 11B is a schematic drawing in plan view for describing a relationship between an object detection range 5a and the leakage magnetic field area 4a, for a case in which positional shifting is large between the power supplying coil 1 and the power receiving coil 3, in an electric vehicle 2 as a power receiving body according to the present invention. In this manner, with the present invention, in contrast to comparative example 1 and comparative example 2, regardless of whether or not positional shifting exists between the power supplying coil 1 and the power receiving coil 3, the object detection ranges 5, 5a are set to a wide range concentrically with respect to the leakage magnetic field areas 4, 4a.

A power receiving body according to the present invention is equipped with a non-contact charging device that charges a storage battery by receiving power from a power supplying coil in a non-contact manner by a power receiving coil, the power receiving body comprising a peripheral object detecting unit configured to be capable of detecting an object within a periphery of the power receiving coil, an object detection range setting unit configured to variably set an object detection range of the peripheral object detecting unit, and a leakage magnetic field area estimating unit configured to estimate a leakage magnetic field area in which a magnetic field intensity by the power supplying coil becomes equal to or greater than a predetermined value, responsive to a non-contact charging state between the power supplying coil and the power receiving coil. The object detection range setting unit is configured to set the object detection range variably corresponding to a position of the leakage magnetic field area, and to set the object detection range to be greater than the leakage magnetic field area that is estimated by the leakage magnetic field area estimating unit.

According to the present invention, an object detection range, which corresponds to a non-contact charging condition between the power supplying coil and the power receiving coil, is set, together with variably setting the object detection range corresponding to the leakage magnetic field area. Therefore, it can reliably be detected if an object enters into the leakage magnetic field area, a surplus range portion of the object detection range with respect to the leakage magnetic field area can be minimized, and it is possible to suppress detection of objects needlessly up to a range outside of the leakage magnetic field area.

In practice, during non-contact charging, in the case that an object has entered into the object detection range, in order to limit exposure of the leakage magnetic field with respect to the object, either the leakage magnetic field area is eliminated by stopping supply of power from the power supplying coil, or a sequence is transitioned to for narrowing the leakage magnetic field area by constricting the supplied power. As a consequence, although there is a problem in that the charging time is extended until the power of the storage battery reaches a predetermined charge amount, according to the present invention, situations in which such a problem occurs can be minimized.

Thus, according to the present invention, it is possible to reliably detect an object within the leakage magnetic field area, to suppress detection of objects unnecessarily (excessively) within areas that do not correspond to the leakage magnetic field area, and to continue charging insofar as possible, even in the case of relative shifting in position between the power supplying coil and the power receiving coil in relation to non-contact transmission (non-contact charging).

In this case, the object detection range setting unit may set the object detection range using at least one of a positional shift amount between the power supplying coil and the power receiving coil, a storage battery voltage, and an output power of the power supplying coil. Therefore, the object detection range can be set appropriately responsive to the non-contact charging condition.

Moreover, by making the power receiving body to be a vehicle, which is equipped with the power receiving coil on a lower surface thereof, it is possible to reduce the area into which the object detection range protrudes beyond the vehicle width.

According to the present invention, an effect is achieved in that an object detection range, which corresponds to a non-contact charging condition between the power supplying coil and the power receiving coil, is set, together with variably setting the object detection range corresponding to the leakage magnetic field area. Therefore, it can reliably be detected if an object enters into the leakage magnetic field area, a surplus range portion of the object detection range with respect to the leakage magnetic field area can be minimized, and it is possible to suppress detection of objects needlessly up to a range outside of the leakage magnetic field area.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 4 is a descriptive diagram of a leakage magnetic field area map;

FIG. 5 is a flowchart for providing a description of operations of the non-contact charging system;

FIG. 6A is a schematic drawing in plan view for describing a relationship between an object detection range and a leakage magnetic field area, for a case in which there is no positional shifting;

FIG. 6B is a schematic drawing in plan view for describing a relationship between an object detection range and a leakage magnetic field area, for a case in which there is positional shifting;

FIG. 7A is a schematic drawing in plan view for describing a setting example (allowance margin=0) of the object detection range with respect to the leakage magnetic field area;

FIG. 7B is a schematic drawing in plan view for describing a setting example (allowance margin=α) of the object detection range with respect to the leakage magnetic field area;

FIG. 9A is a schematic drawing in plan view for describing a relationship between an object detection range and a leakage magnetic field area, for a case in which the storage battery voltage is low;

FIG. 9B is a schematic drawing in plan view for describing a relationship between an object detection range and a leakage magnetic field area, for a case in which the storage battery voltage is high;

FIG. 10A is a schematic drawing in plan view for describing a relationship between an object detection range and a leakage magnetic field area, for a case in which a gap between the power supplying coil and the power receiving coil is small;

FIG. 10B is a schematic drawing in plan view for describing a relationship between an object detection range and a leakage magnetic field area, for a case in which a gap between the power supplying coil and the power receiving coil is large;

FIG. 11A is a schematic drawing in plan view for describing a relationship between the object detection range and the leakage magnetic field area, for a case in which there is no positional shifting between the power supplying coil and the power receiving coil, in a power receiving body according to the present invention;

FIG. 11B is a schematic drawing in plan view for describing a relationship between the object detection range and the leakage magnetic field area, for a case in which the amount of positional shifting is large between the power supplying coil and the power receiving coil, in a power receiving body according to the present invention;

FIG. 12A is a schematic drawing in plan view at a time that non-contact charging is started according to a comparative example 1;

FIG. 12B is a schematic drawing in plan view for describing a relationship between the object detection range and the leakage magnetic field area according to comparative example 1;

FIG. 12C is a schematic drawing in plan view for describing a relationship between the object detection range and the leakage magnetic field area, for a case in which the amount of positional shifting is large between the power supplying coil and the power receiving coil, in comparative example 1;

FIG. 12D is a schematic drawing in plan view for describing a relationship between the object detection range and the leakage magnetic field area, for a case in which the supplied power is constricted, in the state shown in FIG. 12C;

FIG. 13A is a schematic drawing in plan view for describing a relationship between the object detection range and the leakage magnetic field area according to a comparative example 2; and FIG. 13B is a schematic drawing in plan view for describing a relationship between the object detection range and the leakage magnetic field area, for a case in which the amount of positional shifting is large between the power supplying coil and the power receiving coil, in comparative example 2.

DESCRIPTION OF THE PREFERRED EMBODIMENTS

Below, a preferred embodiment of a power receiving body and a vehicle comprising the power receiving body according to the present invention will be described in detail below with reference to the accompanying drawings.

Figure 1:
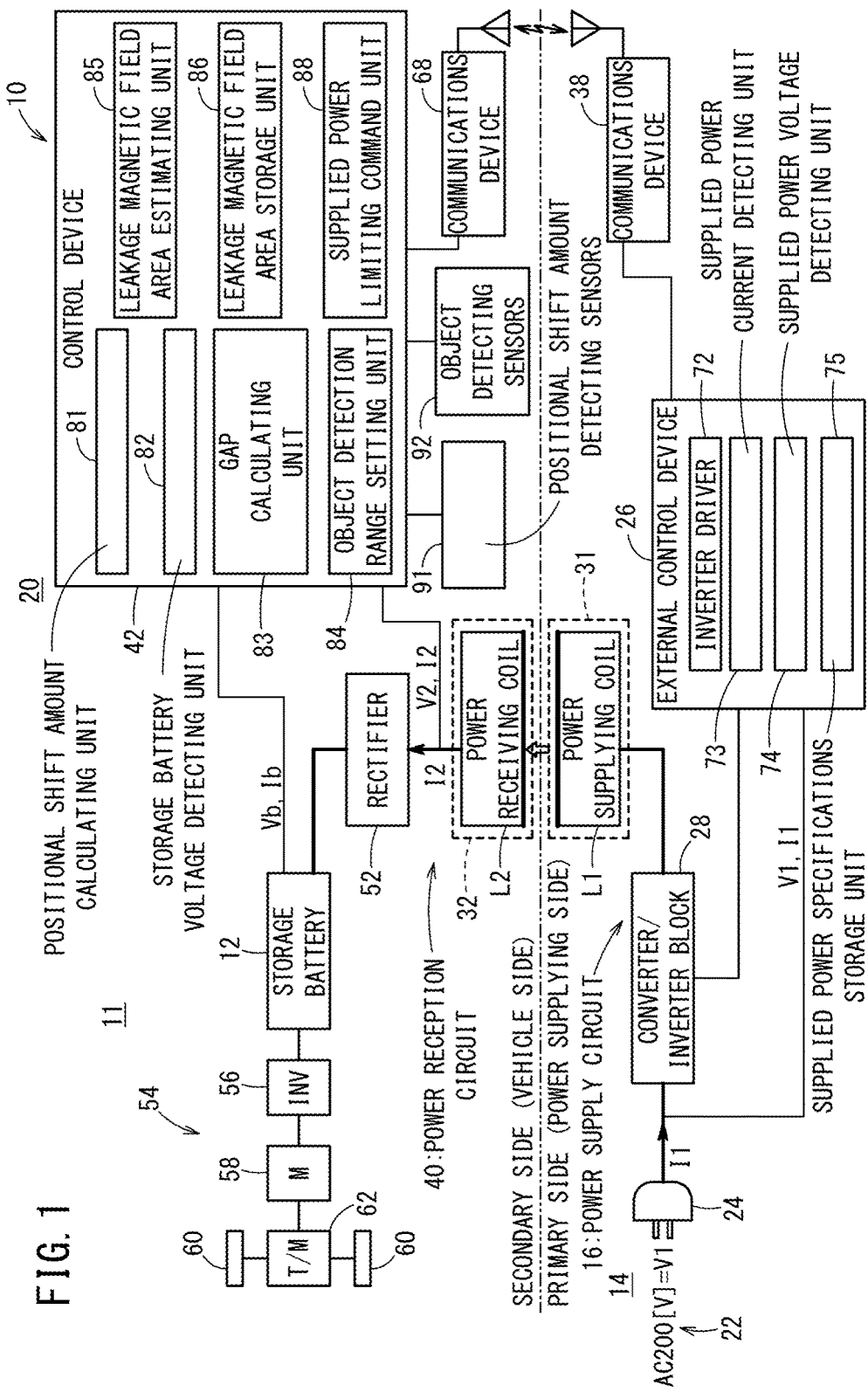
FIG. 1 is an outline schematic diagram of a power receiving body and an electric vehicle as a vehicle that comprises the power receiving body according to the present embodiment, and a non-contact charging system comprising an external power supplying device.

In FIG. 1, there is shown a non-contact charging system 20, which is equipped with a power receiving body and an electric vehicle 11 as a vehicle that comprises the power receiving body according to the present embodiment, and an external power supplying device 14 that charges in a non-contact manner a storage battery 12 made up from a lithium ion battery or the like which is mounted in the electric vehicle 11. In FIG. 1, there is shown the electric vehicle 11 having a non-contact charging device 10, the constituent elements thereof on the upper side of the two-dot-dashed line being a secondary side (vehicle side), and the external power supplying device 14, the constituent elements thereof on the lower side of the two-dot-dashed line being a primary side (power supplying side).

Figure 2:
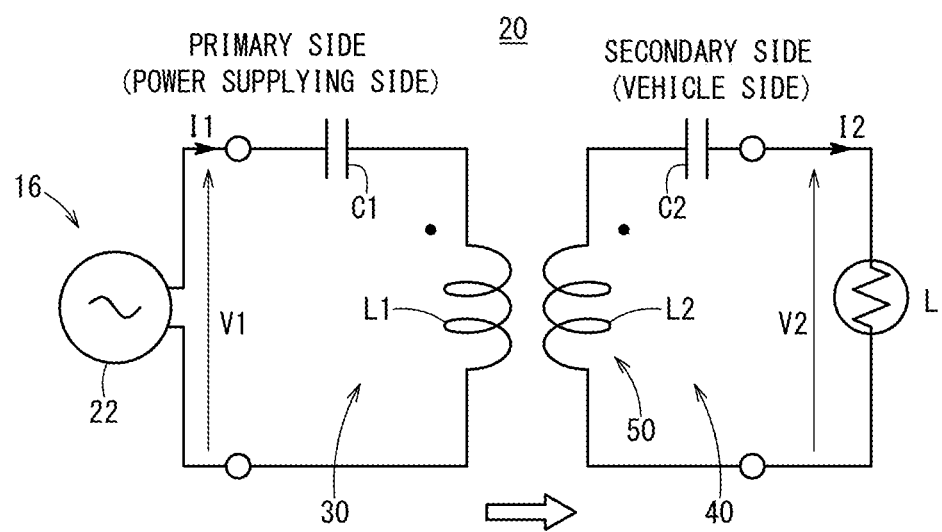
FIG. 2 is a simplified equivalent circuit diagram of the non-contact charging system.

FIG. 2 is a simplified equivalent circuit diagram of the non-contact charging system 20 shown in FIG. 1. According to the present embodiment, as a non-contact power transmission system, although a magnetic resonance system is described as an example, in the present invention, instead of such a magnetic resonance system, a non-contact charging system using electromagnetic induction can also be applied.

In FIGS. 1 and 2, the external power supplying device 14, which forms the primary side (power supplying side), basically is constituted from a power supply circuit 16 and an external control device 26.

The power supply circuit 16 comprises an AC power source circuit 22 of AC 200 [V] (primary side voltage V1=200 [V]), a converter/inverter block 28, and a power supplying antenna (power transmission antenna) 30 of the primary side (power supplying side), which is made up from a primary capacitor C1 and a power supplying coil (primary coil) L1 for serving as a resonant circuit.

The power supplying coil L1 is arranged such that a height thereof from the road surface (ground surface) is disposed at a predetermined height.

According to the present embodiment, the power supplying coil L1, which is constituted from a flat round coil, is arranged on the road surface (ground surface), as a power supplying pad 31 having a flat rectangular parallelpiped shape (square shape as viewed in plan).

The external control device 26 detects an AC power of the AC power source circuit 22 as a supplied power P1 (P1=V1×I1, where V1 is a primary voltage (supply voltage) which is an AC voltage, and I1 is a primary current (supply current) which is an AC current), together with carrying out drive controls (an ON/OFF control and a duty ratio variable control) of the converter/inverter block 28. A communications device 38 is connected to the external control device 26.

On the other hand, in addition to the storage battery 12, the electric vehicle 11 basically is constituted from a power reception circuit 40, a control device 42 that controls charging from the power supply circuit 16 to the storage battery 12, and a vehicle propulsion unit 54 which form a secondary side (power receiving side, load side). The control device 42 may be configured in a divided manner from a storage battery control device, so-called storage battery ECU (Electronic Control Unit), and a charge control device ECU that controls the non-contact charging system 20 in its entirety.

The power reception circuit 40 is constituted from a power receiving antenna (power receiving side antenna, signal receiving antenna) 50 made up from a secondary capacitor C2 and a power receiving coil (secondary coil) L2 that serve as a resonance circuit (see FIG. 2), and a rectifier 52 (see FIG. 1) that rectifies the received power (load power) P2, which is an AC power received by the power receiving coil L2. The received power P2 supplied to the load L is represented by the product (P2=V2×I2) of a received voltage (secondary voltage) V2, which is an output voltage from the power reception circuit 40, and a charging current I2, which is an output current, i.e., secondary current, output from the power reception circuit 40, and is detected by the control device 42.

According to the present embodiment, the power receiving coil L2, which is constituted from a flat round coil, is arranged on a lower surface of the electric vehicle 11, as a power receiving pad 32 having a flat rectangular parallelpiped shape (square shape as viewed in plan).

Figure 3A:
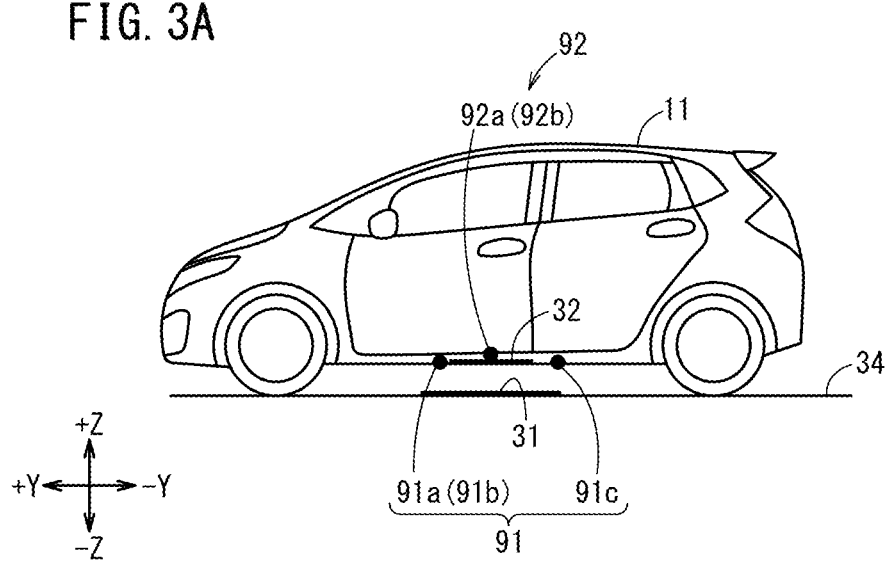
FIG. 3A is a schematic diagram in side view at a time of non-contact power supply.
Figure 3B:
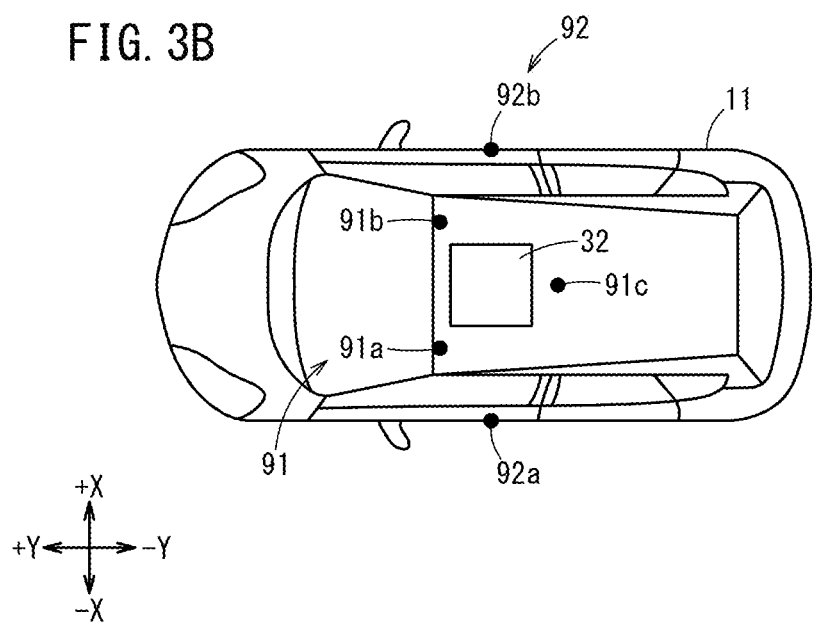
FIG. 3B is a schematic diagram in plan view at a time of non-contact power supply.

As shown in the side view schematic diagram of FIG. 3A and the plan view schematic diagram of FIG. 3B, the power receiving pad 32 (power receiving coil L2) is arranged in a substantially central position on the bottom surface of the electric vehicle 11, ultrasonic sensors 91a, 91b are mounted on both sides of the power receiving pad 32 (power receiving coil L2) on the front side of the electric vehicle 11, and another ultrasonic sensor 91c is mounted substantially centrally in the transverse direction on a rear vehicle side of the power receiving pad 32 (power receiving coil L2) of the electric vehicle 11. The three ultrasonic sensors 91a to 91c constitute positional shift amount detecting sensors 91 that detect the amount of positional shifting of the power receiving pad 32 (power receiving coil L2) with respect to the power supplying pad 31 (power supplying coil L1) when the vehicle is stopped (during non-contact charging) or the like. The positional shift amount detecting sensors 91, instead of the ultrasonic sensors 91a to 91c, can be replaced by a laser range finder, a camera, or the like.

The power supplying pad 31 as a primary pad is arranged on a road surface (ground surface) 34.

Furthermore, ultrasonic sensors 92a, 92b are each attached substantially in center portions of left and right side sills of the electric vehicle 11. The ultrasonic sensors 92a, 92b constitute object detecting sensors 92 that serve as peripheral object detecting units. The object detecting sensors 92, instead of the ultrasonic sensors 92a, 92b, can be replaced by infrared sensors, cameras, or the like.

In accordance with the directions of the arrows shown in FIGS. 3A and 3B, the forward/rearward (longitudinal) directions (+Y, −Y), the left/right (lateral) directions (−X, +X), and the up/down (gap) directions (+Z, −Z) will be described. It should be noted that, in practice, in relation to the gap Z, there is actually no negative value (−Z).

The vehicle propulsion unit 54, which is controlled by a non-illustrated vehicle propulsion control device, is connected to the storage battery 12. The vehicle propulsion unit 54 comprises an inverter 56 that converts a voltage (storage battery voltage) Vb of the storage battery 12 into an alternating current, a motor-generator 58 for vehicle propulsion that is driven by the inverter 56, and a transmission 62 that transmits rotary power from the motor-generator 58 to drive wheels 60. Since the present invention is mainly applied to non-contact power transmission from the external power supply circuit 16 during stopping or parking of the electric vehicle 11, detailed descriptions of the structure and operations of the vehicle propulsion unit 54 are omitted.

In addition to an electric vehicle or a so-called EV, which is driven only by the storage battery 12, the electric vehicle 11 according to the present invention may be any vehicle which is capable of being charged by external power, such as a hybrid vehicle equipped with an engine, a range extender vehicle, and a fuel cell vehicle equipped with a fuel cell, etc.

The non-contact charging device 10 includes the control device 42. Apart from the storage battery 12 and the power receiving antenna 50 (power receiving coil L2), a communications device 68, which carries out wireless communications with the communications device 38 of the external control device 26, is connected to the control device 42. Furthermore, the aforementioned positional shift amount detecting sensors 91 and the object detecting sensors 92 are connected to the control device 42.

The control device 42 and the external control device 26 are each constituted by ECUs, respectively. Each of the ECUs is a calculating device including a microcomputer, which in addition to a CPU (Central Processing Unit), a ROM (including an EEPROM) and a RAM (random access memory) as memories, further include input/output devices such as an A/D converter, a D/A converter, and the like, and a timer that functions as a timing unit. By the CPU reading out and executing programs stored in the ROMs, the ECUs function as various function realizing units (function realizing means), for example, a controller, a computation unit, and a processing unit, etc.

In the present embodiment, the external control device 26 that makes up the external power supplying device 14 functions as an inverter driver 72 for performing a PWM (Pulse Width Modulation) drive control, which is a duty ratio control, of the converter/inverter block 28, a supplied power current detecting unit 73 that detects the primary current I1, and a supplied power voltage detecting unit 74 that detects the primary voltage V1, etc. In the external control device 26, there is included a supplied power specifications storage unit 75 in which there are stored characteristics of the power supplying coil L1 and specifications of the external power supplying device 14.

On the other hand, the control device 42 that makes up the non-contact charging device 10 comprises a positional shift amount calculating unit 81 that calculates an amount of positional shifting with respect to each of the centers in the XY directions (left/right/front/rear directions) of the power supplying pad 31 including the power supplying coil L1, and the power receiving pad (secondary pad) 32 including the power receiving coil L2, based on an output from the positional shift amount detecting sensors 91. In addition, the control device 42 further includes a storage battery voltage detecting unit 82 that detects the voltage (storage battery voltage) Vb of the storage battery 12, a gap calculating unit 83 that calculates the gap Z (facing distance in the vertical direction) between the power supplying pad 31 and the power receiving pad 32 based on an output from the positional shift amount detecting sensors 91 and the charging efficiency (transmission efficiency) η, etc., an object detection range setting unit 84 that sets the object detection range by the object detecting sensors 92, a leakage magnetic field area estimating unit 85, a leakage magnetic field area storage unit 86 in which multiple leakage magnetic field areas (hereinafter referred to as leakage magnetic field areas Lmfa) are stored, and a supplied power limiting command unit 88, etc.

When the vehicle is parked for the purpose of carrying out non-contact charging, as shown in FIGS. 3A and 3B, among the ultrasonic sensors 91a to 91c that constitute the positional shift amount detecting sensors 91, in accordance with outputs of the ultrasonic sensors 91a, 91b, the positional shift amount calculating unit 81 calculates a left/right shift amount (−X, +X) of the (center of gravity of the surface of the) power receiving pad 32, i.e., the (center of gravity of the surface of the) power receiving coil L2, with respect to the (center of gravity of the surface of the) power supplying pad 31, i.e., the (center of gravity of the surface of the) power supplying coil L1, and together therewith, in accordance with outputs of the ultrasonic sensors 91a, 91c or outputs of the ultrasonic sensors 91b, 91c, the positional shift amount calculating unit 81 calculates a front/rear shift amount (+Y, −Y) of the (center of gravity of the surface of the) power receiving pad 32, i.e., the (center of gravity of the surface of the) power receiving coil L2, with respect to the (center of gravity of the surface of the) power supplying pad 31, i.e., the (center of gravity of the surface of the) power supplying coil L1.

Furthermore, the gap calculating unit 83 calculates the value of a vertical gap (interval) Z of the power receiving pad 32 (power receiving coil L2) with respect to the power supplying pad 31 (power supplying coil L1), by referring to a non-illustrated gap calculation map (gap calculation characteristic), which is created and stored beforehand in a storage unit, based on the positional shift amount (−X, +X, +Y, −Y) calculated in the positional shift amount calculating unit 81, the charging efficiency (transmission efficiency) η, and the storage battery voltage Vb.

In this case, the charging efficiency η can be calculated by the equation η [%]=100×P2/Pout from the supplied power Pout [kW]=V1×I1 obtained through the communications devices 38, 68 from the external control device 26, and the received power P2 [kW]=V2×I2 obtained from the output of the power receiving coil L2.

Reference to the storage battery voltage Vb is in order to take into consideration the influence (change) of the input resistance value (load resistance value) of the charging circuit, which is composed of the storage battery 12 and the rectifier 52. In other words, since the charging efficiency (charging characteristic) η is changed by the load resistance value, which shows the input resistance value of the rectifier 52, by referring to the storage battery voltage Vb, the gap (interval) Z is estimated from the charging efficiency (transmission efficiency) η, and the positional shift amount (−X, +X, +Y, −Y).

For example, since the charging efficiency (transmission efficiency) η changes due to the storage battery voltage Vb, even if the relative positioning between the power supplying pad 31 (power supplying coil L1) and the power receiving pad 32 (power receiving coil L2) are of the same conditions, when the gap (interval) Z is estimated, the gap (interval) Z cannot be estimated only by the charging efficiency (transmission efficiency) η and the positional shift amount (−X, +X, +Y, −Y), and it becomes possible to be estimated by referring to the storage battery voltage Vb as well.

In FIG. 4, there is shown the schematic configuration of a leakage magnetic field area map (leakage magnetic field area characteristic), in which leakage magnetic field areas Lmfa=A, B, C, D, etc., are measured or simulated beforehand, and are stored in the leakage magnetic field area storage unit 86. Although not illustrated, in FIG. 4, leakage magnetic field areas Lmfa also are stored beforehand inside of the blank rectangular areas.

In the leakage magnetic field areas Lmfa=A, B, C, D, etc., there are set and stored as parameters the storage battery voltage Vb [V] of the storage battery 12, the calculated gap Z [cm] between the power supplying coil L1 and the power receiving coil L2, and the supplied power P1 (hereinafter also referred to as a supplied power Pout) [kW] of the external power supplying device 14.

Although detailed images of the leakage magnetic field areas Lmfa=A, B, C, D, etc. will be described later, the characters A, B, C, D are representative of respective diameters of the leakage magnetic field area Lmfa. As the diameter thereof is greater, the area of the leakage magnetic field area Lmfa becomes greater.

Operations of the non-contact charging system 20 including the non-contact charging device 10, which is configured as described above, will be described more specifically with reference to the flowchart of FIG. 5.

After driving has been completed such that the position of the power receiving pad 32 of the electric vehicle 11 coincides with the power supplying pad 31 on the road surface 34, the control device 42 of the electric vehicle 11, which is currently stopped or parked with the drive source thereof such as an engine and/or a motor-generator 58 or the like being in a non-operating state, detects whether or not a non-illustrated charging start request switch has transitioned from an OFF state to an ON state, in step S1.

In the case that the switch has been transitioned to the ON state (step S1: YES), in step S2, the control device 42 detects the charging condition.

In step S2, from the outputs of the shift amount detecting sensors 91 and the charging efficiency η, etc. the positional shift amount calculating unit 81 and the gap calculating unit 83 calculate the positional shift amount XY and the gap Z of the power receiving pad 32 (power receiving coil L2) of the electric vehicle 11 with respect to the power supplying pad 31 (power supplying coil L1) on the road surface 34. Further, the control device 42 detects the supplied power Pout (supplied power output specifications of the external power supplying device 14) acquired by the communications with the external control device 26 through the communications device 68 and the communications device 38. Furthermore, the storage battery voltage detecting unit 82 of the control device 42 detects the storage battery voltage Vb.

In this manner, in step S2, the charging conditions (supplied power, positional shift amount, gap, storage battery voltage)=(Pout, XY, Z, Vb) are detected.

Next, in step S3, the storage battery voltage detecting unit 82 of the control device 42 acquires (detects) the storage battery voltage Vb. The significance of detecting the storage battery voltage Vb in step S3 is because it is necessary for the storage battery voltage Vb to be detected consecutively (continuously) during charging.

Next, in step S4, the leakage magnetic field area estimating unit 85 of the control device 42 estimates the leakage magnetic field area Lmfa that is compatible with the charging conditions (Pout, XY, Z, Vb), by referring to the leakage magnetic field area map (see FIG. 4) that is stored in the leakage magnetic field area storage unit 86, based on the charging conditions (Pout, XY, Z, Vb), i.e., the supplied power Pout, the positional shift amount XY, the gap Z, and the storage battery voltage Vb.

For example, in the case that the charging conditions (Pout, XY, Z, Vb) are Pout=Pout3, XY=(0, 0), Z=small, and Vb=Vb1, the leakage magnetic field area is estimated to be Lmfa=A.

At this time, as shown in FIG. 6A, the center (center of gravity) of the power receiving coil L2 of the electric vehicle 11 coincides with the center (center of gravity) of the power supplying coil L1 of the road surface 34, and the leakage magnetic field area Lmfa=A is estimated by a circle, which is defined by setting roughly the vehicle width from the matching centers as the diameter thereof.

Next, in step S5, the object detection range setting unit 84 of the control device 42 sets the object detection range R (in this case, R=Ra) to a slightly widened concentric circle with respect to the leakage magnetic field area Lmfa=A, by adding the allowance margin a to the leakage magnetic field area Lmfa=A.

A setting example when the object detection range R is set with respect to the leakage magnetic field area Lmfa, and the value of the margin allowance α at the time of setting, will be described with reference to FIGS. 7A, 7B, and 8.

As shown in FIG. 7A, in the case that the power supplying coil L1 is shifted to the right side with respect to the power receiving coil L2, the leakage magnetic field area Lmfa is formed while being shifted in the +X direction. In this case, ideally, the object detection range R, which is a region in which a human body or the like is detected, is a range defined by a concentric circle that overlaps with the leakage magnetic field area Lmfa, which is an area into which the human body or the like is not permitted to enter.

Figure 8:
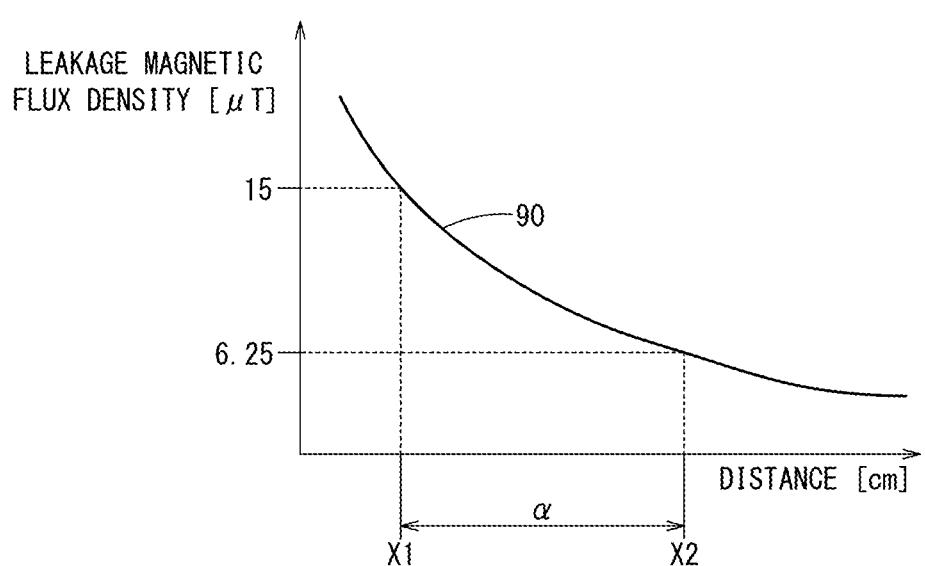
FIG. 8 is a characteristic diagram of a setting example of values of the allowance margin of the object detection range with respect to the leakage magnetic field area.

However, because it is difficult to set the range on the same circle when taking into consideration the accuracy, etc., of the shift amount detecting sensors 91 and the object detecting sensors 92, according to the present embodiment, as shown in FIG. 8, in the vicinity of the power supplying coil L1, with reference to a characteristic 90, by which the leakage magnetic flux density [μT] decreases in inverse proportion to the cube of the distance, the leakage magnetic field area Lmfa (X=X1) is set to 15 [μT], from which a person who is wearing a pacemaker must be protected, whereas the object detection range R (X=X2) determining the allowance margin α (α=X2−X1) is set roughly to 6.25 [μT], which is the ICNIRP1998 guideline regulated value.

Thus, as shown in FIG. 7B, the diameter of the object detection range R is set to a diameter of A+2α with respect to the diameter of the leakage magnetic field area Lmfa=A.

The leakage magnetic field area estimating process of step S4 and the object detection range setting process of step S5 will now be described, in accordance with differences in the charging conditions (Pout, XY, Z, Vb).

In the case that the charging conditions (Pout, XY, Z, Vb) are not the charging conditions (Pout3, (0,0), small, Vb1) for the situation "Positional Shift: NONE" shown in FIG. 6A, but rather are the charging conditions (Pout3, (+X, −Y), small, Vb1) for the situation "Positional Shift: YES", then as shown in FIG. 4, the leakage magnetic force area is estimated to be Lmfa=B.

Stated otherwise, as shown in FIG. 6B, a leakage magnetic field area Lmfa=B, for which the center position thereof is a position that is shifted +X in the vehicle transverse direction and −Y in the rearward direction, is estimated. Further, the object detection range R (in this case, R=Rb) of a slightly widened concentric circle is set by adding the allowance margin α to the leakage magnetic field area Lmfa=B. The size of the leakage magnetic field area Lmfa=B is estimated to be larger than the leakage magnetic field area Lmfa=A because the leakage magnetic field area Lmfa becomes larger when the amount of positional shifting between the power receiving coil L2 and the power supplying coil L1 increases.

In the case that the charging conditions (Pout, XY, Z, Vb) are not the charging conditions (Pout3, (0,0), small, Vb1) for the situation "Voltage: LOW" shown in FIG. 9A, but rather are the charging conditions (Pout3, (0, 0), small, Vb2) for the situation "Voltage: HIGH" shown in FIG. 9B, then as shown in FIG. 4, the leakage magnetic force area is estimated to be Lmfa=C.

More specifically, as shown in FIG. 9B, the center of the power receiving coil L2 of the electric vehicle 11 coincides with the center of the power supplying coil L1 of the road surface 34, and the leakage magnetic field area Lmfa=C is estimated by a circle, which is defined by setting a length that is shorter than the vehicle width from the matching centers as the diameter thereof. In this case, the charging current 12 that flows into the rectifier 52 from the power receiving coil L2 becomes smaller, and therefore, the leakage magnetic field area Lmfa becomes narrowed to the leakage magnetic field area Lmfa=C. Further, a slightly widened object detection range R (in this case, R=Rc) is set by adding the allowance margin a to the leakage magnetic field area Lmfa=C.

In the case that the charging conditions (Pout, XY, Z, Vb) are not the charging conditions (Pout3, (0,0), small, Vb1) for the situation "Gap: SMALL" shown in FIG. 10A, but rather are the charging conditions (Pout3, (0, 0), large, Vb1) for the situation "Gap: LARGE" shown in FIG. 10B, then as shown in FIG. 4, the leakage magnetic force area is estimated to be Lmfa=D.

More specifically, as shown in FIG. 10B, the center of the power receiving coil L2 of the electric vehicle 11 coincides with the center of the power supplying coil L1 of the road surface 34, and the leakage magnetic field area Lmfa=D is estimated by a circle, which is defined by setting a length that is longer than the vehicle width from the matching centers as the diameter thereof. In this case, since the gap Z is larger, the leakage magnetic field area Lmfa is widened to become the leakage magnetic field area Lmfa=D. Further, a slightly widened object detection range R (in this case, R=Rd) is set by adding the allowance margin a to the leakage magnetic field area Lmfa=D.

By being set in this manner, when charging is initiated in step S6, then in step S7, monitoring is preformed by the control device 42 through the object detecting sensors 92 to determine whether or not an object such as a human body or the like has entered inside of the object detection range R, and in the case that such an object is not detected and there is no entry (step S7: NO), then in step S8, the control device 42 determines whether or not the state of charge SOC of the storage battery 12 has reached a predetermined charge amount.

On the other hand, in the case that an object is detected and entry of the object has occurred (step S7: YES), then in step S9, the supplied power limiting command unit 88 of the control device 42 executes an output limiting mode process to request of the external control device 26 that the supplied power Pout be constricted, and thereafter, in step S8, the control device 42 determines whether or not the state of charge SOC of the storage battery 12 has reached a predetermined charge amount. With the output limiting mode, the external control device 26 constricts the supplied power Pout through the inverter driver 72 so as to be on the order of the object detection range R=Ra. Moreover, in the case it is detected that an object such as a human body or the like has entered into the object detection range R (step S7: YES), a notification to that effect may be provided through an alarm, a warning, or the like.

In the case that the predetermined charge amount has not been reached (step S8: NO), the processes of steps S3 to S7 (S9) are repeated, whereas if the predetermined charge has been reached (step S8: YES), the charging process is terminated.

Summary of Embodiment

According to the present embodiment, the electric vehicle 11, as a power receiving body equipped with the non-contact charging device 10 that supplies charging power to the storage battery 12 by receiving power from the power supplying coil L1 in a non-contact manner by the power receiving coil L2, comprises the object detecting sensors (peripheral object detecting units) 92 that are capable of detecting objects within the periphery of the power receiving coil L2, the object detection range setting unit 84 that variably sets an object detection range R of the object detecting sensors 92, and the leakage magnetic field area estimating unit 85 that estimates the leakage magnetic field area Lmfa, in which a magnetic field intensity by the power supplying coil L1 becomes equal to or greater than a predetermined value, responsive to a non-contact charging state between the power supplying coil L1 and the power receiving coil L2.

In this case, the object detection range setting unit 84 sets the object detection range R variably corresponding to a position of the leakage magnetic field area Lmfa, together with setting the object detection range R to be greater than the leakage magnetic field area Lmfa that is estimated by the leakage magnetic field area estimating unit 85.

In this manner, the leakage magnetic field areal Lmfa is set corresponding to the charging conditions, i.e., (supplied power, positional shift amount, gap, storage battery voltage) =(Pout, XY, Z, Vb), which define the non-contact charging state between the power supplying coil L1 and the power receiving coil L2, together with the object detection range R being set variably responsive to the leakage magnetic field area Lmfa. Therefore, it can reliably be detected if objects have entered into the object detection range R. Further, a surplus range (allowance margin α) portion of the object detection range R with respect to the leakage magnetic field area Lmfa can be minimized, and it is possible to suppress detection of objects needlessly up to a range outside of the leakage magnetic field area Lmfa.

Thus, according to the present embodiment, it is possible to reliably detect objects within the leakage magnetic field area Lmfa based on the object detection range R, to suppress detection of objects unnecessarily (excessively) within areas that do not correspond to the leakage magnetic field area Lmfa since such objects lie outside of the object detection range R, and to continue charging insofar as possible, even in the case of relative shifting in position between the power supplying coil L1 and the power receiving coil L2 in relation to non-contact transmission (non-contact charging).

The non-contact charging state is defined by at least one of the positional shift amount (X, Y, Z) between the power supplying coil L1 and the power receiving coil L2, the storage battery voltage Vb, and the supplied power of the power supplying coil L1 (output power of the power supplying coil L1) Pout, and the object detection range setting unit 84 sets the object detection range R using any one, any two, or all of such defining features.

Therefore, the object detection range R can be set appropriately responsive to the non-contact charging condition.

Further, it is possible to reduce the area into which the object detection range R protrudes beyond the vehicle width of the electric vehicle 11.

The present invention is not limited to the embodiment described above, and it is a matter of course that various additional or modified structures may be adopted therein based on the content disclosed in the present specification. For example, in addition to the round coils (flat round coils) described above, concerning the coil shapes thereof, the power supplying coil L1 and the power receiving coil L2 may be rectangular coils (rectangular spiral coils as viewed in plan), ring shaped circular coils as viewed in plan, ring shaped rectangular coils as viewed in plan, rod shaped solenoid coils, or any combination thereof.

What is claimed is:

1. A power receiving body equipped with a non-contact charging device that charges a storage battery by receiving power from a power supplying coil in a non-contact manner by a power receiving coil, comprising:
    a peripheral object detecting unit configured to be capable of detecting an object within a periphery of the power receiving coil;
    an object detection range setting unit configured to variably set an object detection range of the peripheral object detecting unit; and
    a leakage magnetic field area estimating unit configured to estimate a leakage magnetic field area in which a magnetic field intensity by the power supplying coil becomes equal to or greater than a predetermined value, responsive to a non-contact charging state between the power supplying coil and the power receiving coil;
    wherein the object detection range setting unit is configured to set the object detection range variably corresponding to a position of the leakage magnetic field area, and to set the object detection range to be greater than the leakage magnetic field area that is estimated by the leakage magnetic field area estimating unit.

2. The power receiving body according to claim 1, wherein the object detection range setting unit is configured to set the object detection range using at least one of a positional shift amount between the power supplying coil and the power receiving coil, a storage battery voltage, and an output power of the power supplying coil.

3. A vehicle equipped with a non-contact charging device that charges a storage battery by receiving power from a power supplying coil in a non-contact manner by a power receiving coil, comprising:
    a peripheral object detecting unit configured to be capable of detecting an object within a periphery of the power receiving coil which is provided on a lower surface of the vehicle;
    an object detection range setting unit configured to variably set an object detection range of the peripheral object detecting unit; and
    a leakage magnetic field area estimating unit configured to estimate a leakage magnetic field area in which a magnetic field intensity by the power supplying coil becomes equal to or greater than a predetermined value, responsive to a non-contact charging state between the power supplying coil and the power receiving coil;
    wherein the object detection range setting unit is configured to set the object detection range variably corresponding to a position of the leakage magnetic field area, and to set the object detection range to be greater than the leakage magnetic field area that is estimated by the leakage magnetic field area estimating unit.

4. The vehicle according to claim 3, wherein the object detection range setting unit is configured to set the object detection range using at least one of a positional shift amount between the power supplying coil and the power receiving coil, a storage battery voltage, and an output power of the power supplying coil.

* * * * *